(12) United States Patent
Skomoroch et al.

(10) Patent No.: US 8,650,177 B2
(45) Date of Patent: Feb. 11, 2014

(54) SKILL EXTRACTION SYSTEM

(75) Inventors: Peter N. Skomoroch, Sunnyvale, CA (US); Matthew T. Hayes, Milpitas, CA (US); Abhishek Gupta, Palo Alto, CA (US); Dhanurjay A. S. Patil, Belmont, CA (US)

(73) Assignee: LinkedIn Corporation, Mountain View, CA (US)

( * ) Notice: Subject to any disclaimer, the term of this patent is extended or adjusted under 35 U.S.C. 154(b) by 36 days.

(21) Appl. No.: 13/357,171

(22) Filed: Jan. 24, 2012

(65) Prior Publication Data

US 2012/0197863 A1    Aug. 2, 2012

Related U.S. Application Data

(60) Provisional application No. 61/436,894, filed on Jan. 27, 2011.

(51) Int. Cl.
*G06F 17/30*     (2006.01)
(52) U.S. Cl.
USPC .......................................................... 707/710
(58) Field of Classification Search
USPC .......................................................... 707/710
See application file for complete search history.

(56) References Cited

U.S. PATENT DOCUMENTS

| | | | |
|---|---|---|---|
| 2005/0015432 A1* | 1/2005 | Cohen | 709/201 |
| 2006/0184464 A1 | 8/2006 | Tseng et al. | |
| 2006/0218111 A1* | 9/2006 | Cohen | 706/45 |
| 2008/0065481 A1 | 3/2008 | Immorlica et al. | |
| 2008/0172415 A1 | 7/2008 | Fakhari et al. | |
| 2008/0313000 A1* | 12/2008 | Degeratu et al. | 705/8 |
| 2009/0006193 A1 | 1/2009 | Forbes et al. | |
| 2011/0238591 A1* | 9/2011 | Kerr et al. | 705/321 |
| 2012/0197906 A1* | 8/2012 | Landau et al. | 707/748 |
| 2012/0197993 A1 | 8/2012 | Skomoroch et al. | |

OTHER PUBLICATIONS

Ackerman, Mark, "Sharing Expertise: Beyond Knowledge Management", The MIT Press (Cambridge, Massachusetts), (2003), 438 pgs.
Becerra-Fernandez, Irma, "Searching for Experts on the Web: A Review of Contemporary Expertise Locator Systems", ACM Transactions on Internet Technology 6(4), (Nov. 2006), 333-355.
D'Amore, Raymond, "Expertise Community Detection", SIGIR, (Jul. 25-29, 2004), 498-499.
Dom, Byron, et al., "A Bayesian Technique for Estimating the Credibility of Question Answerers", SIAM, (2008), 399-409.
Dom, Byron, et al., "Graph-Based Ranking Algorithms for E-mail Expertise Analysis", DMKD, (Jun. 13, 2003), 42-48.
Fu, Yupeng, et al., "Finding Experts Using Social Network Analysis", IEEE/WIC/ACM International Conference on Web Intelligence, (2007), 77-80.

(Continued)

*Primary Examiner* — Joshua Bullock
(74) *Attorney, Agent, or Firm* — Schwegman Lundberg & Woessner, P.A.

(57) ABSTRACT

In an example, disclosed is a machine automated method of identifying a set of skills. In some examples, the method includes extracting a plurality of skill seed phrases from a plurality of member profiles of a social networking site, creating a plurality of disambiguated skill seed phrases by disambiguating the plurality of skill seed phrases using one or more computer processors, and de-duplicating the plurality of disambiguated skill seed phrases to create a plurality of de-duplicated skill seed phrases.

24 Claims, 17 Drawing Sheets

(56) References Cited

OTHER PUBLICATIONS

Grolmus, Petr, et al., "A Web-Based User-Profile Generator: Foundation for a Recommender and Expert Finding System", 8th ICCC International Conference on Electronic Publishing, (Jun. 2004), 331-342.

Haselmann, Till, et al., "Towards a Conceptual Model for Trustworthy Skills Profiles in Online Social Networks", ERCIS, (2010), 13 pgs.

Huh, Eui-Nam, et al., "A Framework of Online Community based Expertise Information Retrieval on Grid", Kyung Hee University Memo, (Aug. 11, 2008), 21 pgs.

Huh, Eui-Nam, et al., "A Framework of Online Community based Expertise Information Retrieval on Grid", Kyung Hee University Memo, (Jan. 14, 2010), 21 pgs.

John, Ajita, et al., "Collaborative Tagging and Expertise in the Enterprise", WWW2006, (May 22-26, 2006), 6 pgs.

Li, Juanzi, et al., "EOS: Expertise Oriented Search Using Social Networks", WWW 2007 / Poster Paper, (May 8-12, 2007), 1271-1272.

Malek, Maria, et al., "Exhaustive and Guided Algorithms for Recommendation in a Professional Social Network", EISTI-Laris laboratory, PRES Cergy University, (Jul. 31, 2010), 19 pgs.

Meyer, Bertolt, et al., "skillMap: dynamic visualization of shared organizational context", Institute of Information Systems, Humboldt University Berlin, (Feb. 20, 2006), 13 pgs.

Pretschner, Alexander, "Ontology Based Personalized Search", Department of Electrical Engineering and Computer Science, University of Kansas, (1998), 125 pgs.

Stankovic, Milan, et al., "Looking for Experts? What can Linked Data do for you?", LDOW, (Apr. 27, 2010), 10 pgs.

Tang, Jie, et al., "ArnetMiner: An Expertise Oriented Search System for Web Community", International Semantic Web Conference—ISWC, (2007), 8 pgs.

Yimam-Seid, Dawit, et al., "Expert Finding Systems for Organizations: Problem and Domain Analysis and the DEMOIR Approach", Journal of Organizational Computing and Electronic Commerce 13(1), (2003), 1-24.

Zhang, Jing, et al., "Expert Finding in a Social Network", Department of Computer Science and Technology, Tsinghua, University Database Systems for Advanced Applications—DASFAA, (2007), 1066-1069.

Steggles, Andy, "Keeping Score of Your Online Member Engagement", Associations Now, [Online]. Retrieved from the Internet: <URL: http://www.asaecenter.org/Resources/ANowDetail.cfm?ItemNumber=3828>, (Jan. 2009), 7 pgs.

"U.S. Appl. No. 13/357,360, Final Office Action mailed Jun. 27, 2013", 22 pgs.

"U.S. Appl. No. 13/357,360, Non Final Office Action mailed Oct. 11, 2012", 13 pgs.

"U.S. Appl. No. 13/357,360, Response filed Mar. 18, 2013 to Non Final Office Action mailed Oct. 11, 2012", 17 pgs.

Lin, Ching-Yung, et al., "SmallBlue: Social Network Analysis for Expertise Search and Collective Intelligence", IEEE International Conference on Data Engineering, (2009), 4 pgs.

"U.S. Appl. No. 13/357,360, Response filed Nov. 20, 2013 to Final Office Action mailed Jun. 27, 2013", 18 pgs.

"U.S. Appl. No. 14/072,955, Preliminary Amendment filed Dec. 10, 2013", 10 pgs.

\* cited by examiner

| | SEARCH AND SEIZURE | SEARCH | SEIZURE | LAW ENFORCEMENT | GOOGLE | COMPUTER SOFTWARE |
|---|---|---|---|---|---|---|
| SEARCH AND SEIZURE | 1 | 7 | 9 | 15 | 1 | 0 |
| SEARCH | 7 | 1 | 3 | 5 | 8 | 5 |
| SEIZURE | | | 1 | 4 | 0 | 2 |
| LAW ENFORCEMENT | | | | 1 | 1 | 2 |
| GOOGLE | | | | | 1 | 8 |
| COMPUTER SOFTWARE | | | | | | 1 |

Figure 16 Example (cont)

ized list of skills.
SKILL EXTRACTION SYSTEM

CLAIM OF PRIORITY

This patent application claims the benefit of priority, under 35 U.S.C. Section 119(e), to U.S. Provisional Patent Application Ser. No. 61/436,894, entitled "Skill Extraction and Ranking System," filed on Jan. 27, 2011 to Skomoroch, et. al, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, Co., 2011, All Rights Reserved.

BACKGROUND

A social networking service is a computer or web-based application that enables users to establish links or connections with persons for the purpose of sharing information with one another. Some social networks aim to enable friends and family to communicate with one another, while others are specifically directed to business users with a goal of enabling the sharing of business information.

SUMMARY

In an example, disclosed is a method of identifying a set of skills by extracting a plurality of skill seed phrases from a plurality of member profiles of a social networking service. The method can also include disambiguating the plurality of skill seed phrases to create a plurality of disambiguated skill seed phrases and de-duplicating the plurality of disambiguated skill seed phrases to create a plurality of de-duplicated skill seed phrases, the de-duplicated skill seed phrases identifying a plurality of skills.

In another example, disclosed is a system including an extraction module configured to extract a plurality of skill seed phrases from a plurality of member profiles of a social networking service, a disambiguation module configured to disambiguating the plurality of skill seed phrases to create a plurality of disambiguated skill seed phrases, and a de-duplication module configured to de-duplicate the plurality of disambiguated skill seed phrases to create a plurality of de-duplicated skill seed phrases, the plurality of de-duplicated skill seed phrases identifying a plurality of skills.

In yet another example, disclosed is a machine readable storage medium including instructions, which when executed on the machine, cause the machine to extract a plurality of skill seed phrases from a plurality of member profiles of a social networking service, disambiguate the plurality of skill seed phrases to create a plurality of disambiguated skill seed phrases, and de-duplicate the plurality of disambiguated skill seed phrases to create a plurality of de-duplicated skill seed phrases, the de-duplicated skill seed phrases identifying a plurality of skills.

These examples can be combined in any permutation or combination. This summary is intended to provide an overview of subject matter of the present patent application. It is not intended to provide an exclusive or exhaustive explanation of the invention. The detailed description is included to provide further information about the present patent application.

Figure 1:
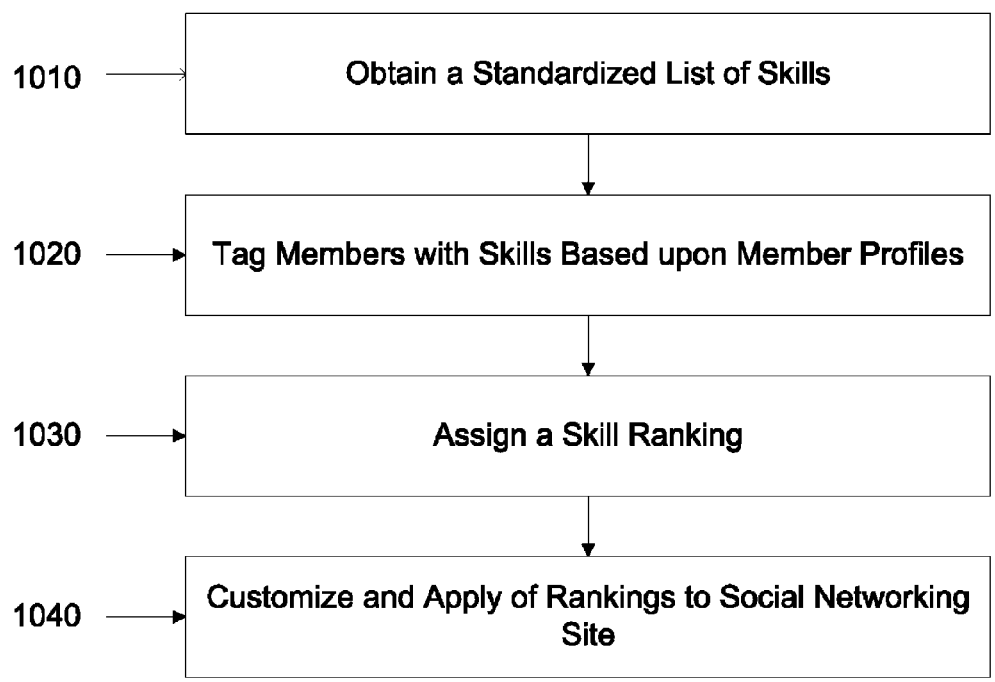
FIG. 1 shows one example method of the current disclosure.

In the drawings, which are not necessarily drawn to scale, like numerals may be associated with similar components shown in different views. Like numerals having different letter suffixes may represent different instances of similar components. The drawings illustrate generally, by way of example, but not by way of limitation, various embodiments discussed in the present document.

DETAILED DESCRIPTION

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service. A social networking service is an online service, platform or site that allows members to build or reflect social networks or social relations among members. Typically, members construct profiles, which may include personal information such as name, contact information, employment information, photographs, personal messages, status information, links to web-related content, blogs, and so on. Typically, only a portion of a members profile may be viewed by the general public, and/or other members.

The social networking site allows members to identify, and establish links or connections with other members in order to build or reflect social networks or social relations among members. For instance, in the context of a business networking service (a type of social networking service), a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member than has the option of accepting or declining the invitation.

In general, a connection or link represents or is otherwise associated with an information access privilege, such that a first person who has established a connection with a second person is, via the establishment of that connection, authorizing the second person to view or access non-publicly available portions of their profiles. Of course, depending on the particular implementation of the business/social networking service, the nature and type of the information that may be shared, as well as the granularity with which the access privileges may be defined to protect certain types of data may vary greatly.

In the context of business social networks, users often may submit a list of skills that they possess as part of their member profiles. Other users, advertisers, and businesses may then use these skill lists to ascertain what a particular member is good at or interested in. The inherent problem with using member-submitted skills is that it is entirely subjective and prone to fraud. Thus a member may present him or herself as having a skill they do not possess. In addition, even though a member may possess a certain skill, there is no indication that they are proficient in that skill.

The present disclosure describes a method, system and product for identifying a set of standardized skills from member profiles of a social or business networking service. The list of standardized skills, along with information in a member profile section of the social networking service may be used to identify members of the social networking service that possess one of those identified skills. Members identified as possessing a given skill may be ranked relative to one another with respect to the given skill based upon various implicit, explicit, internal and external factors. The skills and rankings may be used to deliver content and customization to those members and others.

FIG. 1 presents a high level view of the method according to one example implementation. In step 1010, according to one example implementation, the system may obtain or generate a standardized list of skills with which to rank users relative to one another. With some embodiments, these skills may include specific skills such as the ability to program in a particular programming language, such as Java or C++, or broader skills, such as the ability to program a computer, or specialized skills such as programming web-based applications. While reference is made to skills in the present disclosure, it will be understood by those skilled in the art with the benefit of the present disclosure, that the techniques taught herein are applicable to other concepts.

The standardized list of skills may be obtained by utilizing a pre-determined list of skills. In one example, the predetermined list of skills may be manually generated, but in other examples the pre-determined list of skills may be automatically generated. In still other examples, the list of standardized skills may be created by processing member profiles of a social or business networking service. In some examples, this processing can be done automatically using a computing system or other machine. In yet other examples, this processing could be manually accomplished. In some examples, a skills section of a member profile of a social networking service may be used. The skills section of the member profile may be a free-text section that allows users to freely type in skills they possess, this information is generally referred to as unstructured information. Alternatively in some other examples, the member profile skills section may be implemented as a list that allows users to choose a skill based upon structured data such as a predetermined listing of skills, or in other examples, the skills section may be implemented as some combination of unstructured data such as free-text and structured data such as a pre-determined list selection.

In step 1020, the system may then determine, or "tag" members of the business or social networking service who possess one of the standardized skills. In some examples, "tagging" can include associating an item of meta-data with the member profile of the member who is tagged that indicates that this member possesses a certain skill. In other examples, information about which skills a member possesses may be included directly in the member's profile. In one example, members are tagged based upon the information in their member profile in a social networking service. In other examples, members may select skills they are proficient in from a list of the standardized skills. In still other examples, other members may determine a particular member's skills by use of feedback mechanisms such as surveys.

In step 1030, the system may then rank all the members who have been tagged as possessing certain skills relative to one another to achieve a skill ranking. In one example, the skill ranking is based upon activities that occur on the social networking service. Thus for example, a member who has many connections to other members who also possess the skill would be more highly ranked than other members who have fewer connections to other members who possess the certain skill. In other examples, these connections may be weighted such that a connection to another member who is highly rated for that skill increases the member's ranking more than a similar connection with a lower ranking member. In still other examples, other factors are used to rank members in conjunction with, or instead of, activities on the social networking service. In some examples, authorship of scholarly articles on or about the skill is considered. Authorship or editorship of articles, websites, blogs, Wikipedia entries, or discussion groups or forums may also be considered in other examples.

In step 1040, the rankings and tagging of skills may be used to provide various customization and services to the social or business networking service and its various members. In some examples, members may be provided their rankings. In still other examples, lists may be created and published. In yet other examples, companies and geographical areas may also be ranked using the ranking of individuals who work, live, or are from specific companies or locations. In still another example, recommendations may be generated to members on how to improve their skill ranking.

Obtaining a Standardized List of Skills

Figure 2:
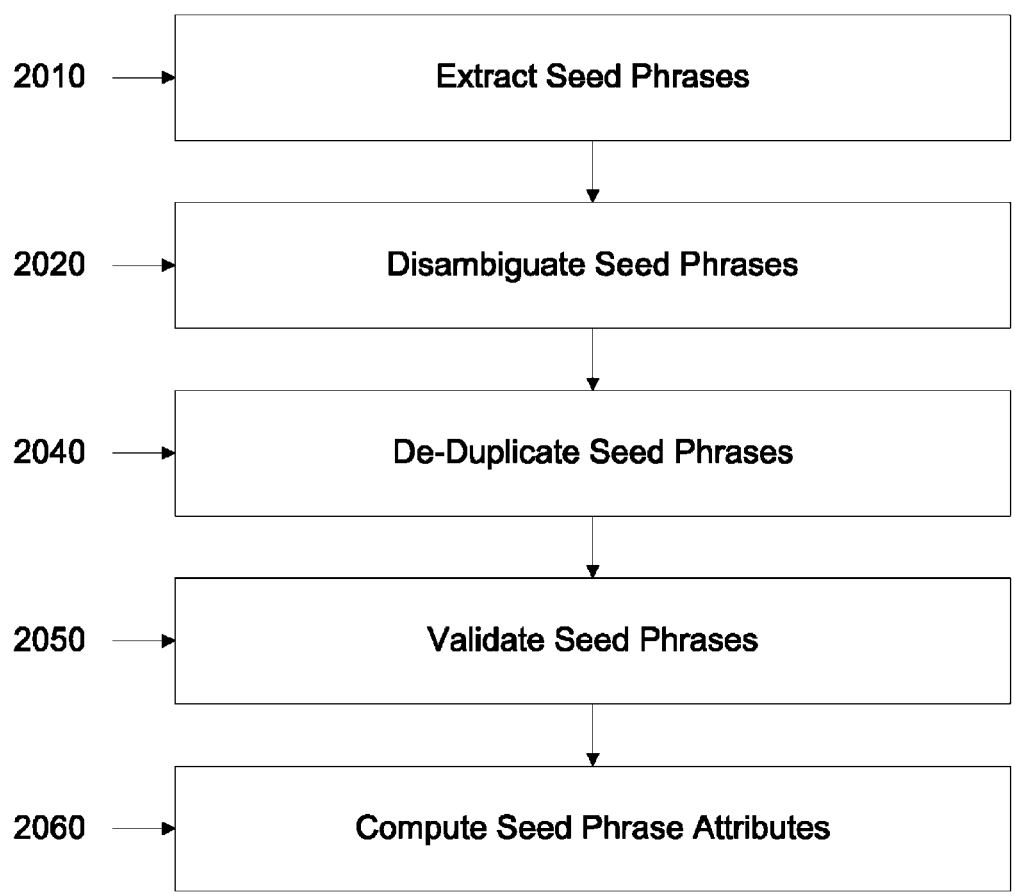
FIG. 2 shows an example method of obtaining a standardized list of skills.

Turning now to FIG. 2, one example method of obtaining a standardized list of available skills is shown. In step 2010, seed phrases may be extracted from text contained in member profiles of members of the business or social networking service. Seed phrases in one example are one or more words that represent a possible skill. The seed phrases may be individual words such as "Java" or phrases of words such as "java.net," or "search and seizure." In one example, the seed phrases may be extracted from a skills section of the member profiles, but in other examples, seed phrases may be extracted from other sections of a member's profile. In one example, the skills section of a member's profile is a free text (e.g., unstructured) section that allows members to type in any skills they feel they possess. In some examples, all member profiles of a social networking service are used to gather seed phrases, but in other examples, only a subset of all member profiles may be used. For example, the system may only extract seed phrases from profiles of members in a particular industry, in a particular geographic region, or who work for a particular company.

Along with gathering the skill seed phrases, context information, or "meta data," may be gathered. One such item of meta data may include co-occurent phrases. Co-ocurrent phrases are words or phrases that occur in the same member profile as the seed words or phrases and are used in a later processing operation as one way of ascertaining an intended meaning of a seed phrase. A given phrase may be a co-occurrent phrase for a particular skill seed phrase, and may be a skill seed phrase itself. Additionally, this meta data may include other information in the member profile of the members in which the seed phrase exists, including a member's reported industry, institution, employer, projects, geographic location, group membership, and the like.

Figure 3:
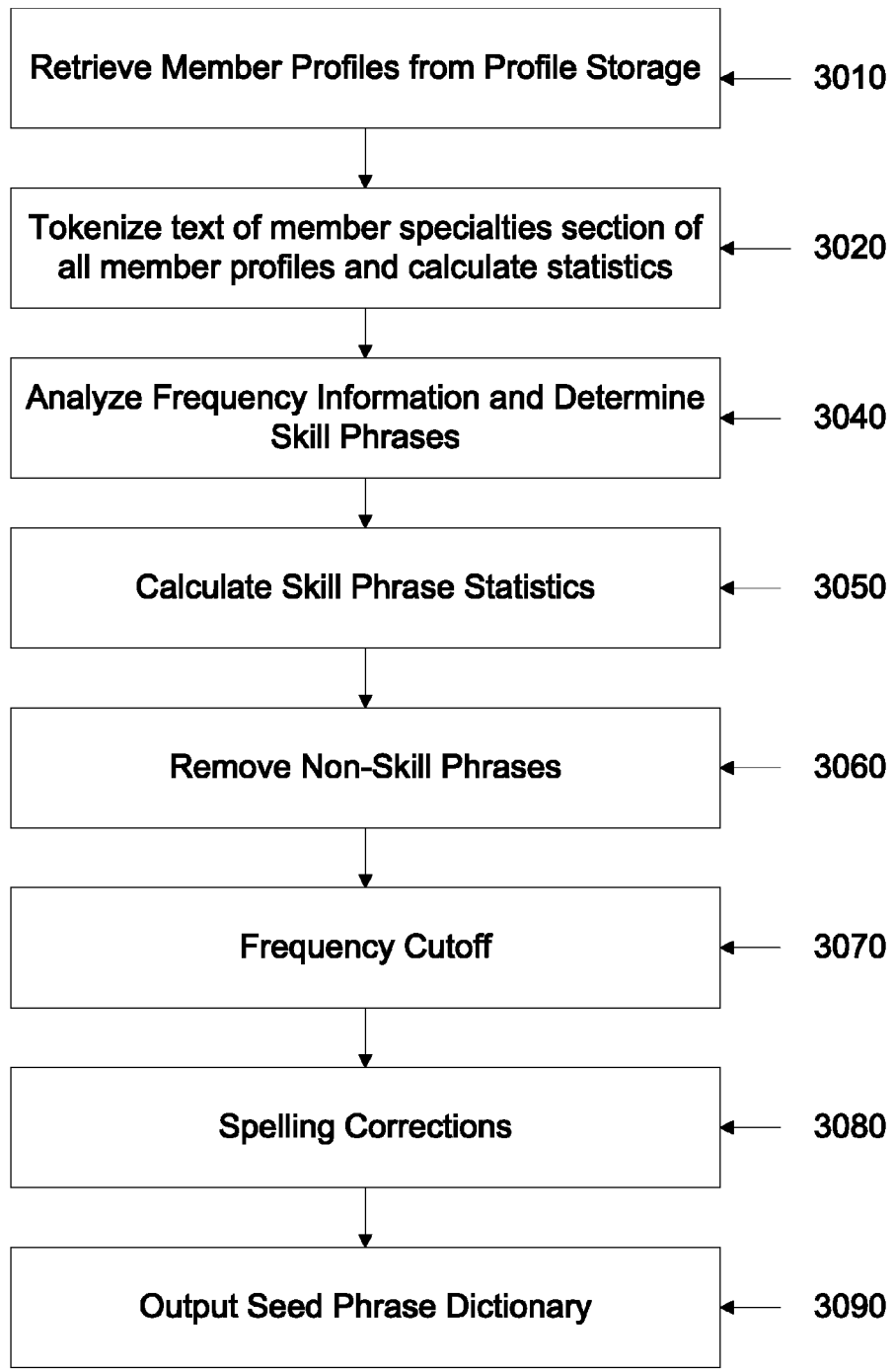
FIG. 3 shows an example method of seed phrase extraction.

FIG. 3 presents one example of the operations performed to extract seed phrases from member profiles. In step 3010 member profiles from a social networking or business networking site are retrieved from an electronic storage area. The electronic storage area may include computer memory, both non-volatile and volatile, a computer database, another computer system, or the like. In some examples, all member profiles are retrieved, but in other examples only certain member profiles may be included in the skill seed phrase extraction. These selected member profiles may be selected based on a variety of factors. Some factors may include a predetermined list of members, members listing an association with a particular school, organization, work environment, workplace, geographic location, skills listed, or member popularity.

In step 3020, the specialties section is retrieved from the member profiles. For instance, with some embodiments, the specialties section is that portion of a member's profile that stores the member's self-described or selected skills, or specialties. Each specialties section may then be tokenized based upon commonly used delimiters such as a comma, slash, carriage return, conjunctive or disjunctive words ("and," "or"), and the like. Tokenization is the process of breaking a stream of text up into words, phrases, symbols, or other meaningful elements called tokens. Thus for example, a member's specialties section of a profile might contain the text "construction industry, housing and development, foundations/ support." The system may initially tokenize this into "construction industry," "housing", "development," "foundations," "support." Once the text is tokenized, the system calculates the number of times a particular token is found in the specialties section of the member profiles of the system. The member specialties section is used herein for illustrative purposes, and as already stated, other sections may be used to establish the skill seed phrases.

In some examples, certain aspects of the present disclosure, including tokenization may be done in parallel using a batch processing system over a distributed computer system. In some examples, this distributed computer system may be managed by Apache Hadoop, which is a software framework that supports data intensive distributed applications developed by the Apache Software Foundation, Inc. In some examples, certain aspects of the present disclosure, including tokenization may be implemented by the MapReduce software method which is a framework for processing huge datasets on distributable problems using a large number of computers (or nodes) which are referred to as a cluster. MapReduce is described in U.S. Pat. No. 7,650,331 issued to Dean, et. al. and assigned to Google Inc., of Mountain View, Calif., which is hereby incorporated by reference in its entirety. In MapReduce, there are two phases: the map phase and the reduce phase. In the "map" phase, "chunks" of data are assigned to different servers which then process the data according to a defined algorithm and return a result. The servers may break up the data into even smaller chunks and assign each smaller chunk to a map process running on the server, where many map functions may execute on a single server. The results from all the map processes are then aggregated according to a predefined process in the "reduce" phase.

In the case of the tokenization in step 3020, the data may be chunked for the map phase into any portion or subportion of the input data used to create the standardized list of skills. In some examples, the chunks may include a plurality of profiles, a single profile, sections of profiles, or even sections of text from a portion of a profile, for example, the specialties or skills section. The map processes may then tokenize the given data chunk by parsing the given data chunk and splitting it into words or phrases based upon the delimiters used. Each map process then returns each token to the reduce process. The reduce process may then count the number of times a particular token has been passed back by all the various map processes, establishing a token frequency. In some examples, this map-reduce frequency calculation may be done multiple times. The first passes may use a minimal set of delimiters whereas additional passes may add additional delimiters. This may result in establishing frequency statistics for both longer phrases ("search and seizure") as well as constituent individual words ("search," and "seizure), which in some examples may be used in later stages.

While distributed computing methods using MapReduce are described throughout this disclosure, it will be appreciated by a person who is skilled in the art with the benefit of the present disclosure that other methods are possible. For example, a single computer system may do all the processing described as opposed to a distributed computing system. Also, instead of MapReduce, other solutions may be used, including but not limited to, the use of "if-then" and "for loop" programming techniques to iterate over all the member profiles and skills section text in order to tokenize and count token frequency, and perform other method steps of the present disclosure. In addition, other distributed computing solutions may be utilized apart from Hadoop. Alternative distributed computing approaches may be employed such as Message Passing Interface ("MPI") or a cluster of workers with a single master node to partition out parsing tasks.

In step 3040, the frequency of token occurrence information may be used to determine whether two different tokens correspond to a specific skill phrase and therefore should not be separated by the tokenization. For example, the phrase "search and seizure," might be broken up in step 3020 into "search" and "seizure," however the skill phrase "search and seizure," would be best kept together as it likely refers to one skill. Some skill phrases such as "C++and Java" should be broken apart into "C++," and "Java," as those are considered separate skills. In some examples, whether or not to split the seed phrases may be determined by calculating whether any of the component tokens occurred individually less often than the compound phrases. If not, then the component tokens will be kept separate, otherwise they will be combined. Thus for example, frequency information for "search," "seizure," and "search and seizure" may be calculated. If "search" appeared 5 times and "seizure" appeared 3 times, but "search and seizure" occurred 10 times, then the skill seed phrase may be the compound phrase "search and seizure."

In step 3050, this first pass data may be fed back into the system to scan member profiles again to determine a count of how many times each phrase occurs in the member profiles. In some examples, this may be done using MapReduce and Hadoop as in step 3020. In this case however, instead of splitting at the selected delimiters automatically, the system may use the analysis performed in step 3040 to come up with a refined splitting algorithm. Thus, for example, instead of splitting "search and seizure," the system may treat it as a single phrase in producing a frequency count if the analysis in step 3040 indicates it should be treated as such. In some examples, this may be an iterative process and the data may be fed back into scan member profiles again, each time with a refined splitting algorithm until the list of skills converges.

In step 3060, certain non-skill seed phrases may be removed from further consideration. Thus phrases clearly not relating to skills may be removed. For example, phrases corresponding to certain categories of language not likely to be skill related may be removed. In some examples, articles, prepositions, verbs, nouns, or any combination may be removed. In some examples, phrases that may be inappropriate, offensive or too graphic may be removed. Various methods may be used to achieve this, including submission of the phrases to crowd-sourcing jobs, dictionaries, or blacklists A "blacklist" is a list that contains common non-skill phrases. If a skill phrase is on the blacklist, it may be removed from further processing. In some examples, this operation may be done prior to tokenization after the member profile section is read from storage.

In step 3070, in some examples, statistically insignificant seed phrases may be removed from further consideration. Thus if the frequency of occurrence of a skill seed phrase is below a threshold, that particular skill seed phrase may be removed from further consideration. Thus, for example, if only one profile out of thousands contains the skill seed phrase, that seed phrase may not be particularly interesting. This allows the size of the skill seed phrase list to be reduced. The threshold may be a predetermined value that indicates a minimum number of times the phrase must occur (e.g., 10 times) to be included, or a predetermined percentage (e.g.,.. it must be included in 0.5% of the scanned member profiles), or some other dynamic algorithm.

In 3080, in some examples, a spelling checker and correction algorithm may be used to find and correct spelling deficiencies in the skill seed phrase list. This is to shrink the size of the skill seed phrase list and make the task of de-duplication easier in later stages by eliminating improperly spelled variants. This may be desirable for skill seed phrases in which misspellings are common.

In step 3090, the resulting list of skill seed phrases not removed from consideration may be output and may be called the "Seed Phrase Dictionary."

In examples in which the set of standardized skills is determined based upon a free-text area of a member's profile, the various collected seed phrases may be ambiguous. That is, phrases may have more than one meaning, or "senses," and subsequently refer to different skills. For example, the text "search," in a user's skill section of a profile, may refer to a law enforcement context, or it may refer to an internet search context, or it may be a talent search context.

Returning now to FIG. 2, because of this problem, in some examples, the next step in obtaining a standardized list of skills may be phrase disambiguation carried out in step 2020. In phrase disambiguation, the list of skill seed phrases may be expanded to capture the different "senses" of the phrases. "Senses" are different meanings of a given phrase. So, for example, if the list of skill seed phrases initially is "search," and information is found in the member profiles to suggest several different senses of "search," then the list of skill seed phrases may be expanded to include all or some of the particular senses. Additionally, the skill seed phrases may be annotated to identify the sense. Thus the list of skill seed phrases might expand from one phrase to three (i.e., "search" becomes "search" in the computer science sense, "search," in the law enforcement sense and "search" in the recruiting sense).

Figures 4, 5:
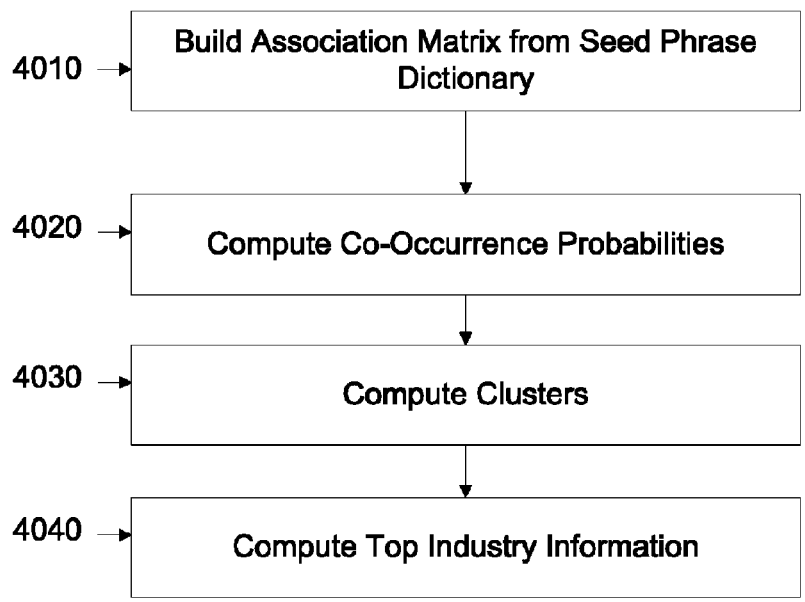
FIG. 4 shows an example method of seed phrase disambiguation.
FIG. 5 shows an example association matrix.

FIG. 4 shows one example implementation of a disambiguation algorithm. In step 4010, an association matrix may be built by reprocessing the skills section of the member profiles again. The MapReduce functionality may be programmed to emit a count of a co-occurrence of each pair of terms in the seed phrase dictionary for every member profile. A co-occurrence is an instance where two seed phrases occurred in the same member profile. Thus if there are ten terms in the seed phrase dictionary, the association matrix may be a ten-by-ten matrix, each row and column intersection in the matrix corresponding to a count of the number of times the pair of dictionary seed phrases occurred in the scanned member profiles. FIG. 5 depicts a basic example of an association matrix that shows the co-occurrence of six dictionary seed phrases. Thus, for example, the term "Search and Seizure" occurred in the same profile as the term "Law Enforcement" 15 times, whereas it never co-occurred with the term "Computer Software."

In step 4020, a probability analysis may be run using the association matrix to determine, based on a given skill seed phrase, what the likely co-occurrent phrases are. This may be expressed as a probability that given a skill seed phrase, a different phrase will be in co-occurrence. Thus, in FIG. 5, the probability that "Search and Seizure" was present in the same profile as "Law Enforcement" will likely be very high. In some examples, this algorithm may include various similarity metrics like Jaccard Similarity or Term Frequency Inverse Document Frequency (TFIDF).

In step 4030, the probabilities may be used to "cluster" the various related seed phrases into senses using the calculated probabilities. The seed phrases may be clustered based upon the probability that certain co-ocurrent terms of the skill seed phrases will occur with other co-occurrent terms. Thus for example, if "search" has a high probability of being co-occurrent with the skill seed phrases "law enforcement," "fbi", "computer programming," and "Java," the system may use the co-occurrent information between those likely co-occurrent phrases to determine "clusters" of "search." Thus for example, if "law enforcement" had a high probability of being co-occurrent with "fbi" and "fbi" had a high probability of being co-occurrent with "law enforcement," but NOT "computer programming," and NOT "Java," then one cluster may be "search, law enforcement, fbi." If Java and computer programming are likely co-occurrent phrases between themselves, then another cluster could be "search, Java, computer programming."

To perform this clustering, an expectation maximum algorithm may be used. For example, an algorithm such as K-means may be used. Co-occurrent phrases may be compared with each other pairwise in the space of all frequently co-occuring or similar phrases for the seed-phrase. Rows of this distance matrix may then be clustered, and clusters may be merged or split as needed until a converged set of disambiguated phrase senses emerge.

In step 4040, the top industry information for each cluster may be computed. This may be done by processing the member profiles using Hadoop and MapReduce again. In this case, the member profiles may be searched for the various dictionary skill seed phrases. Upon finding a dictionary skill seed phrase, the system may read the industry association stored in the member profile. The industry association in some examples is a member-selected industry association. In some examples, the member may select from a predetermined list of industries. In other examples, the industry association may be a free form text association. The clusters may then be analyzed to determine the top industries associated with the skill seed phrases in that cluster. This information may then be stored and used in later stages.

The output of the disambiguation may result in a list of disambiguated skill seed phrase clusters annotated with industry information.

Because the member profile section may contain typos, or different spellings or words to describe a single skill (such as "java net" vs. "java.net"), and because the result of the disambiguation may sometimes lead to skill duplications the disambiguated skill seed phrases may need to be de-duplicated. De-duplication is the process by which duplicate skill seed phrases are removed from further consideration.

Figure 6:
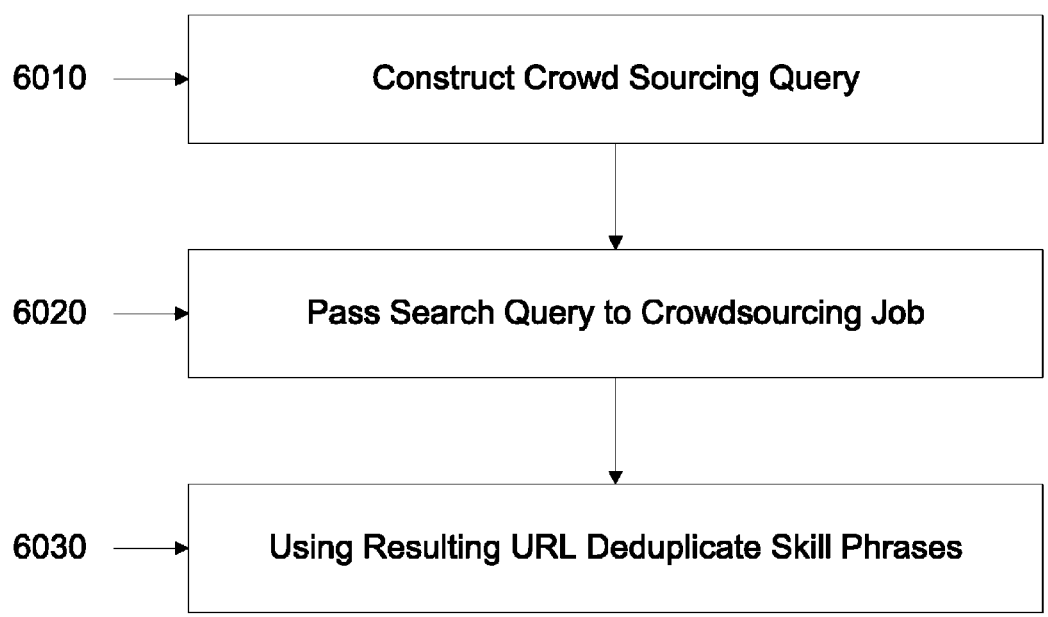
FIG. 6 shows an example method of phrase de-duplication.

Continuing with FIG. 2, in step 2040, the disambiguated skill seed phrases may then be de-duplicated. FIG. 6 shows one example method for de-duplicating the seed phrases. In step 6010, a Wikipedia or other internet search query may be generated using, in some examples, the skill seed phrase, co-occurrent phrases, and/or industry information. In some examples, only the disambiguated skill seed phrase itself is used. In other examples additional information such as co-occurrent phrases, and/or industry information may be used. This internet query may be constructed as merely a concatenation of all the information regarding the skill cluster, such as for example: "search search and seizure law enforcement FBI police sheriff DEA drug enforcement agency." Some other examples may use Boolean operators such as 'and', 'or', 'not', or 'xor' between the various pieces of the search query. Alternatively, the query may be compared against text collections or web pages stored offline using an inverted index or text similarity metrics applied against a document collection.

When the internet web query is executed in an internet or other search engine a list of internet web pages representing a list of possible matches for that query may be produced. In some examples, the internet search engine may be an internet-wide search engine such as Google, run by Google Inc. of Mountain View, Calif. In some examples, the search engine may be a site-specific search engine, such as the search engine of Wikipedia. Wikipedia is a searchable, online, collaborative encyclopedia project supported by the Wikimedia Foundation, a Florida Corporation headquartered in San Francisco, Calif. In some examples the internet web query, when executed in Wikipedia, may return a list of Wikipedia entries corresponding to pages of the Wikipedia.

At step 6020, the skill seed phrase, the co-occurrent phrases, the industry information, and the Wikipedia or other internet search engine query may be passed to a crowdsourcing job of a crowdsourcing application. Crowdsourcing is the act of outsourcing tasks to an undefined, large group of people or community through an open call. In one example implementation of crowdsourcing, a problem or task is broadcast to a group of individuals looking for tasks. Those with an interest in solving the problem decide to accept the task. Once a solution is found, the solution is passed to the party who posed the problem or task. Usually, a small payment is then provided to the party who solved the problem by the party who posed the problem. One example crowdsourcing implementation is Mechanical Turk™ run by Amazon.com, Inc. of Seattle, Wash., in which Amazon provides a marketplace in which businesses post tasks that need completion and offer a reward for completing the task. The reward may be any monetary value, but generally is a small reward of a few pennies per task. Individuals looking for tasks then may accept and complete those tasks to gain the reward.

In one example, the job submitted to the crowdsourcing application may ask the worker to pick the internet web page from the list of internet web-pages returned by the search query that corresponds to the particular skill seed phrase. Thus, in one example, if the skill seed phrase is "search," with a related concurrent phrase "legal," the search query might be "search legal," and may return Wikipedia results such as:

"search and seizure"
"Legally Blonde—The Musical: The Search for Elle Woods"
"JustCite"
"LawMoose" . . .

In that example, the worker would pick "search and seizure" to signify that the particular skill relates to searches and seizures of law enforcement. Other similar skills should return the same page. In this way, in step 6030 duplicate skills may be determined based on common web-pages returned by the crowdsourcing workers.

In some examples, a single skill seed phrase may be submitted to multiple workers. This is to ensure the quality of the worker responses. Each worker would then make their selections, and various algorithms in step 6030 may be used to pick the result if the workers come back with different results. One example algorithm may be a majority algorithm, whereby the page selected by the majority of workers will be selected. Other example algorithms use a consensus pick.

Other examples of de-duplication may be used, such as using the crowd-sourcing worker to sort a list of skill seed phrases to find duplicates using just the skill seed phrases and the co-occurrent phrases and associated industry information. Other implementations may include using the crowdsourcing worker to find a Wikipedia page or other webpage that describes the particular skill without first presenting the worker with a constructed query.

Figure 7:
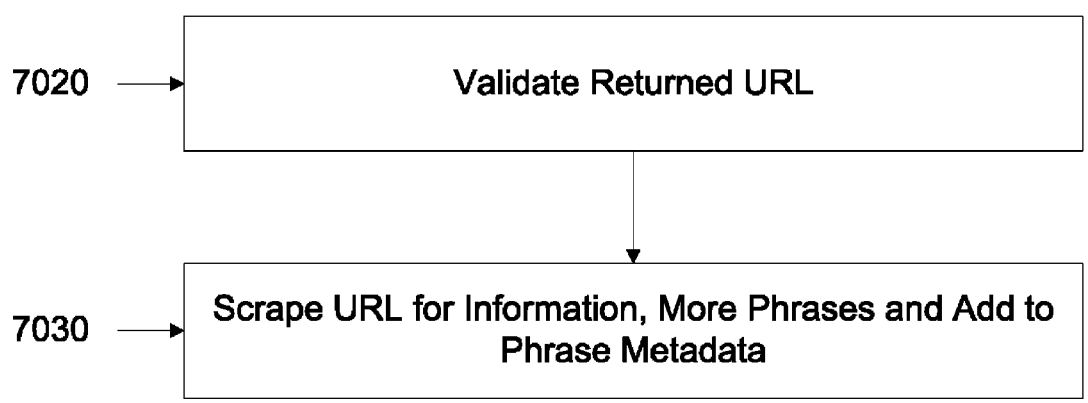
FIG. 7 shows an example method of phrase validation.

Once the disambiguated skill seed phrases are de-duplicated, the phrases may then be validated in step 2050 of FIG. 2. One example validation method is shown in FIG. 7. In step 7020, the Wikipedia or other URL is validated. In one example, this may be validated by another crowdsourcing job that simply asks the worker to determine if the URL returned correctly corresponds with or describes the skill phrase. Other automatic algorithms may be used, including examining the frequency with which the phrases and terms in the skill seed phrase and related meta data (such as the common co-occurrent phrases and industry information) appear in the returned website. A low frequency may indicate an incorrect website that may be flagged for later scrutiny.

In step 7030, the returned URL or Wikipedia entry may be scraped to ascertain more information, such as more related phrases and industries. The result may be added to the skill phrase meta-data and may result in a standardized list of skills and related meta information about those skills that may be used to "tag" individuals with those skills. As already explained, in some examples, the skill phrase meta data may contain co-occurrent phrases, industry information, and the information scraped from the returned URL.

Referring back to FIG. 2, in step 2060, additional attributes may be calculated by running the member profiles back through the profile processing. Such attributes may include calculating the top industry, related phrases, and other statistical information about the skill seed phrases. This extra step may be done in some embodiments, rather than collecting this information along with other processing steps above because the skill phrases may be constantly changing. Thus because of the de-duplication above, the statistics kept (i.e. top industry, etc . . . ) may need to be updated to reflect this de-duplication.

Tagging and Ranking Members with Skills

Returning now to FIG. 1, once a standardized list of skills and possibly other information such as related terms and industries is determined, members with those skills may be determined in step 1020.

Figure 8:
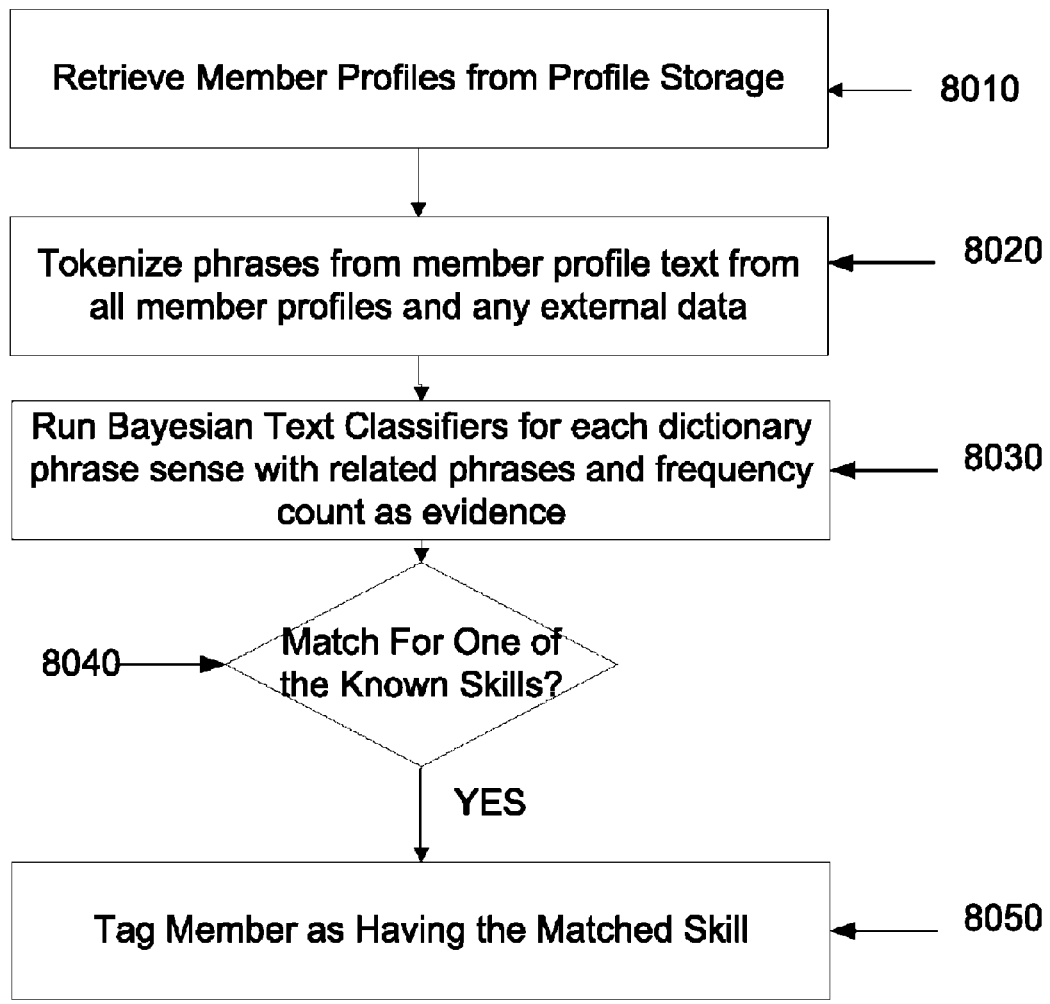
FIG. 8 shows an example method of skill tagging.

FIG. 8 shows an example method of "tagging," or identifying members that possess one of the skills in the standardized list of skills. In step 8010, a set of member profiles may be retrieved from a database or other computer memory. In step 8020 information from the member profiles may be retrieved. In some examples, the information may be the text or a segment thereof of the member specialties section of the member profile. In other examples, the information may also include details such as industry information, company information, or any other piece of information from the member profile including member status updates. In yet other examples, external information from other internet sites may be gathered based upon any link found in a member profile. For example, a website or a blog listed on a profile may be scraped for content that is then tokenized for input into the tagging algorithms. In some examples, if the external site contains another link, that link may then be processed as well.

In step 8030 an algorithm may be used to determine whether, based on all the evidence, a particular member is likely to have a particular skill. In one example, the algorithm may be a Bayesian text classifier. In some examples, there may be a classifier for each skill seed phrase sense that is trained with the skill seed phrase dictionary, related phrases, frequency counts, and/or industry information. In this example, the tokenized phrases of member profile text and external data is fed in as evidence (e.g., input to the algorithm) and the output of the Bayesian classifier is a probability that a particular member possesses a particular skill. Other example algorithms include for example, a neural network, term frequency computations or any text based classification algorithm.

In step 8040, the probability produced by the text classification algorithm at step 8030 may be run through another algorithm to determine whether or not the member should be tagged with a specific skill. In one example, the algorithm may be a threshold value. For example, the threshold could be set so that if the classification algorithm produces a 70% chance that the particular member possesses the given skill, then the member may be tagged as having the particular skill. In other examples, the threshold may vary depending on the application. For example, "tagging" a user with a particular skill for ranking purposes might demand greater certainty than "tagging" a user for advertising purposes. Thus the threshold may be dynamically adjusted based on intended uses of the skill information.

In some examples, tagging may be indicating in some fashion in the member's profile that this member possesses the particular skill. For example, meta data representing the skills possessed by the member may be stored in association with a member's profile. In other examples, tagging may be achieved through keeping a separate list of members that possess the particular skill. Tagging may be accomplished through any means in which the system may store an indication of what particular members possess a particular skill or skills. Tagging may also include storing the probability generated in step 8030.

The result of step 8040 is that members possessing a certain skill are identified and tagged at step 8050. The resulting list of members that possess a certain skill may be a community, or network of individuals with that skill. This may be referred to as a skill community.

Figure 9:
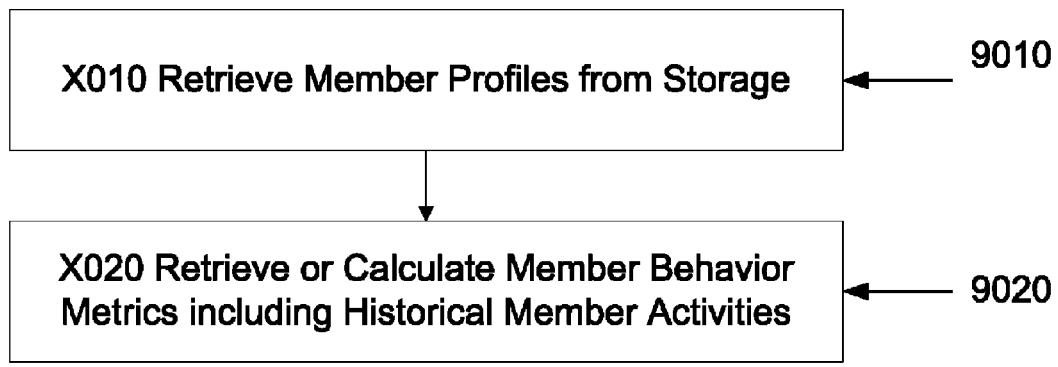
FIG. 9 shows an example method of calculating member behavior metrics.

After members with a particular skill have been identified, or "tagged," those members may be ranked relative to one another. Referring back to FIG. 1, this is step 1030. FIG. 9 shows, in one example implementation, a preliminary step in ranking members.

FIG. 9 shows a collection of member behavior metrics that may be useful in calculating a member's rank in a particular skill. In step 9010 member profiles may be retrieved. In step 9020 member behavior metrics may be collected, derived or calculated. The member behavior metrics may include or be based on information concerning any activity generated by or about the member. In some examples, this may include information about events a member has attended, searches a member has performed, member industry information, how many years of experience the member has, how selective the member is on acceptance of invitations, and the like. In some examples, the behavior metrics may also include endorsement information. The endorsement information includes information relating to an indicator of support or acceptance between individuals. This endorsement information may be not only from the social networking site itself, but also endorsement information from external sites. Endorsements may include data such as profile page views, various follow, mention, and messaging actions on social networks, favorites, shares, upvotes, invitations to connect, acceptance of connections, emails, company relationships, group memberships, location proximity, bookmarks, referrals to that member and from that member, and recommendations. Some example endorsements that may be used include a follower relationship on the microblogging service Twitter, operated by Twitter, Inc. of San Francisco Calif., connections on LinkedIn, run by LinkedIn, Inc. of Mountain View, Calif., friend relationships on Facebook, of Palo Alto, Calif., MySpace of Beverly Hills, Calif., and run by News Corporation, connections on github, run by GitHub, Inc. and the like. In some examples, the endorsement or member behavior activity information may also include frequency information that determines the frequency of a particular connection or behavior.

Figure 10:
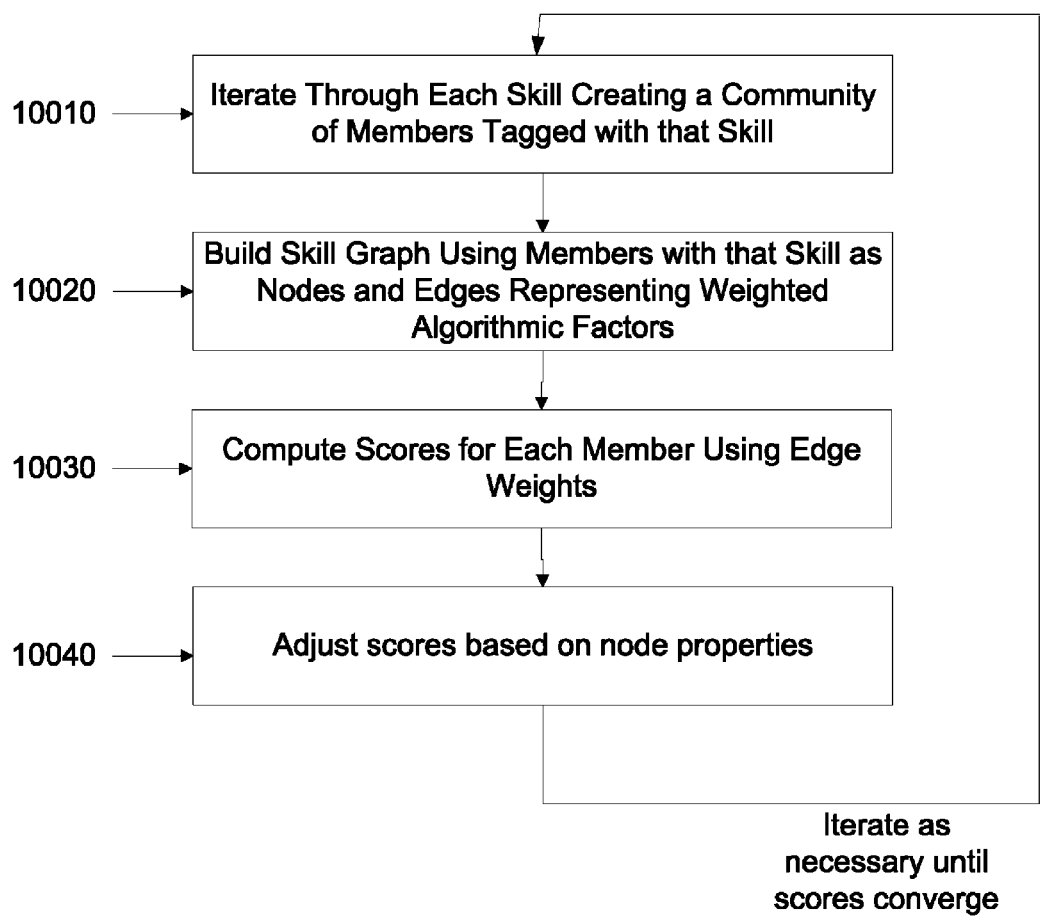
FIG. 10 shows an example method of ranking members.

FIG. 10 shows an example ranking algorithm that may be used to rank members relative to one another. In step 10010 the community of members with a particular skill may be ascertained based on the earlier tagging. In step 10020, a directed skill graph may be built using the various members tagged with the particular skill as nodes and edges representing the various behavior and endorsement metrics calculated in FIG. 9 for each member that apply to the relationship between each of the member nodes. Examples include, but are not limited to, connections, profile views, Twitter followership, message sending between the member nodes, referrals, recommendations, and the like. Each edge may then be given a weight depending on the type of edge that is represented. Thus, in one example, a connection in the social network may be weighted more heavily than a page view. Initial scores may then be computed in step 10030 based on the edge weights. In some examples, the weights of the edges are added together to form the initial score. In other examples, other algorithms may be used.

In step 10040, the properties of each node may be examined to adjust the weight of each edge, and thus the initial score. For example, if two members are connected with an edge, but one member never views the other member's page, then that edge may be given less weight. This indicates that the edge between the members may not be that strong because perhaps a user felt socially obligated to be polite and make a connection rather than decline an invitation. In general, in some examples, if a node has very low behavioral metrics that are representative of member interactions with that member (such as such as profile views, messages, and connection information), the value of the weighting of those edges to and from those nodes may be reduced. Alternatively, in some examples, weightings may be increased or decreased based on the member behavior or endorsement metrics. In some examples, the weight for a particular edge may be increased or decreased based on the initial score of the node with which that edge is associated. Additionally, in some examples, scores may be increased or decreased based on employment, industry associations, location of residence, location of employment, education, and other factors and attributes. This may be based upon, in some examples, the statistics collected and calculated in step 2060 of FIG. 2. Thus for example, if a particular individual worked for, or followed a particular company that was important for a particular skill, that particular member's scores may be increased.

Figure 11:
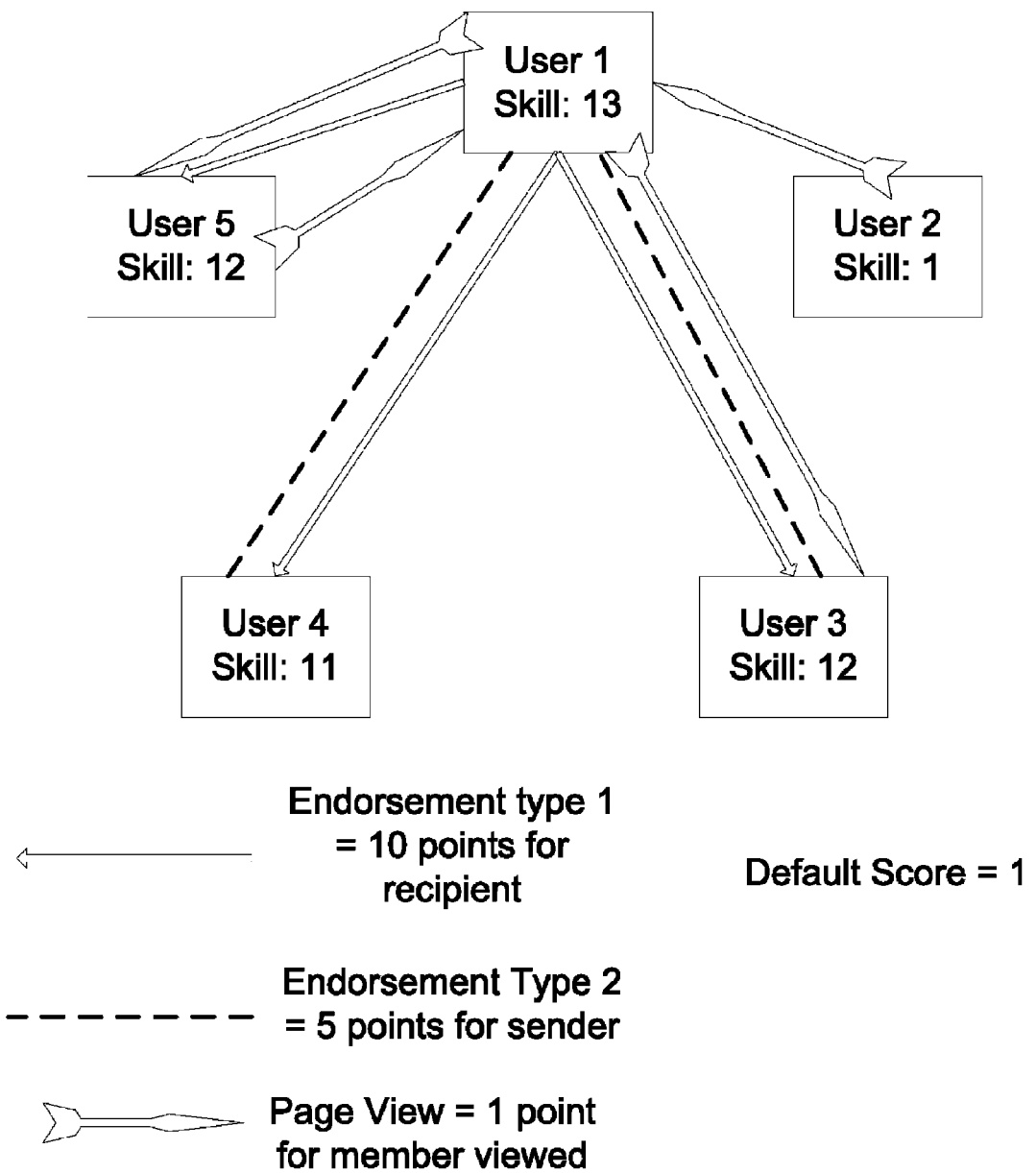
FIG. 11 shows an example skill graph.

An example skill graph is shown in FIG. 11. In FIG. 11, five users are represented as nodes in the graph. An arrow line represents an endorsement from one member to the other. The recipient of the endorsement is awarded 10 points. A dotted line indicates acceptance of the endorsement and increases the sender's score by five points. A flared arrow indicates a page view and is worth one point for the member whose profile or homepage was viewed. Once the edge connections are made, the scores may be calculated. Other scores for each edge connection type may be used; the scores of ten, five, and one for the various behavior metrics are exemplary only. While a simple addition algorithm is demonstrated in FIG. 11, additional algorithms may be used to calculate the scores.

Additionally, once the algorithm has been run once, the algorithm may be re-run, and the strength of the weights to give the various edges may be adjusted based upon the skill rank of the user to which the connection pertains. For example, based upon the initial run presented in FIG. 11, since user 1 has the highest skill level (13), those with connections with user 1 may have the weight of those edge connections increased. Thus an edge connection with user 1 may be worth 11 points as opposed to 10 points in one example. This algorithm may be run until the scores converge. In some examples, eigenvalue centrality algorithms may be used to rank the graph nodes including degree centrality, betweenness centrality, closeness centrality, and eigenvector centrality. This algorithm in another example may incorporate principles of the PageRank®, or HITS (Hyperlink-Induced Topic Search) link analysis algorithm. The PageRank® algorithm is fully described in U.S. Pat. No. 6,285,999 assigned to Stanford University which is hereby incorporated by reference in its entirety. The HITS algorithm is fully described in U.S. Pat. No. 6,112,202 assigned to International Business Machines which is hereby incorporated by reference in its entirety.

Figure 12:
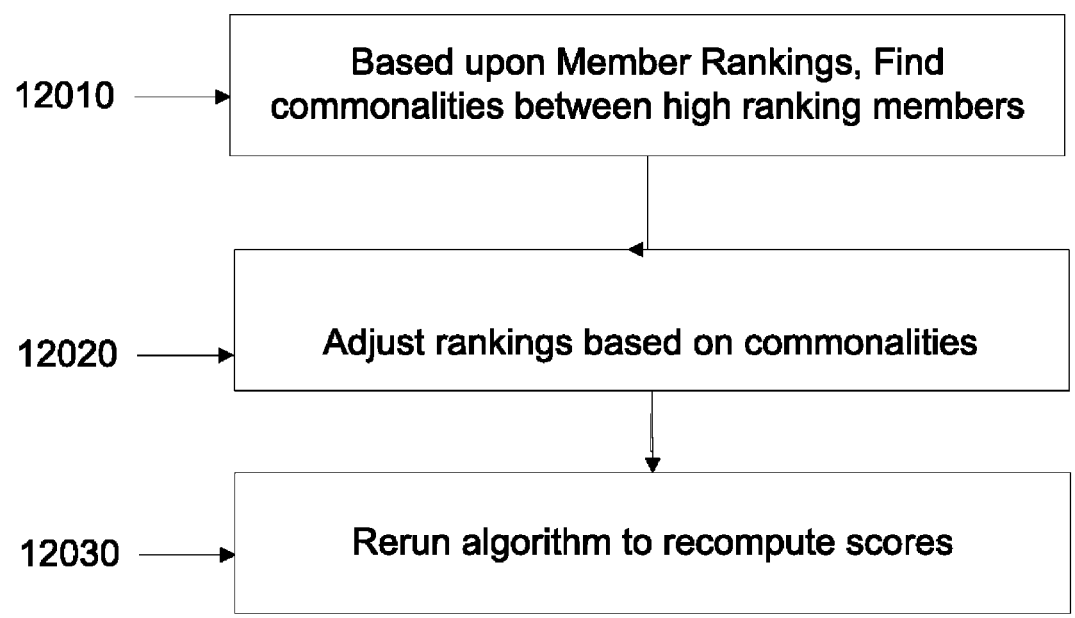
FIG. 12 shows additional steps in some examples of ranking members.

After the scores converge, in some examples, the scores may be modified even further, taking into account certain other attributes. FIG. 12 shows an example method of calculating these other factors. In step 12010 commonalities may be found between members with a particular skill. These commonalities may include identifying which companies employ high ranking members, which schools high ranking members have listed as attending, which geographical locations high ranking members live or work in, which related groups or other social networks high ranking members belong to, and the like. Each of these factors then may be fed back into the ranking process at 12020, such that members of these common groups may have their scores increased or decreased. At step 12030 the member score may then be recomputed using these commonalities by rerunning the algorithm until the scores re-converge. While some of these same factors may have been used in step 10040 of FIG. 10, this step is more accurate as it is based on an actual ranking of the nodes and not just skill seed phrase statistics.

In still other examples, a high ranking in a related skill may be used to increase a member's rank in a particular skill. For example, a high ranking in a skill such as "C++" may increase a member's ranking in a "Java" skill. This may be done by using the phrase attribute statistics collected after phrase validation in the obtaining skills portion, or it may be based on rankings of individuals. For example, the system may examine individuals highly ranked in a particular skill and find out which other skills those individuals are most commonly highly rated in. For example, if most of the highest rated people for the skill "accountant," also have a high skill level for "tax preparation," then an individual who has an "accountant" skill may have their "tax preparation," skill score increased.

Customization Based on the Skill Rankings

Referring back to FIG. 1, once the skill rankings are assigned, various customizations and application of the rankings may be achieved in step 1040. The skills customization methods and processes which create customized features for the social networking service may be implemented separately, in one example—in a separate skills section of the social networking service, or may be integrated into the social networking system, or any combination of the two. Thus the customizations described may be added onto existing sections or pages of the social networking service, or may be a new, stand-alone section, application, or website. These skill customizations may take the form of HTML, text, JavaScript, FLASH, Silverlight, or any other type of textual, audio, video, audiovisual or other content. Customizations may be delivered as part of the social networking service or as part of some other stand alone application.

In some examples, members may be shown their rankings for each skill they are tagged as having, or in other examples, only certain skills will be shown. In other examples, members may be shown other member's rankings. In some examples, an entire list of all members ranked may be shown. In yet other examples, a top-ten, a top-fifty, or some other segment of the rankings may be shown. In yet other examples, members may view information about rankings for skills they are not tagged as having.

In still other examples, a company rank may be computed using the scores of the individuals that represent themselves as working for that particular company. As already noted, this company score may then increase the scores of the individuals that represent that they work for that company. This company rank or score may be displayed to interested users of the social networking service.

In still other examples, a location or geographic rank may be computed using the scores of the individuals that represent themselves as working or living in that area. As already noted, this geographic rank may then increase the scores of the individuals that represent that they lived or worked in that geographic region. In other examples, the geographic rank may be computed based upon a company rank using the locations of the companies. Thus geographic locations with more highly ranked companies will be ranked higher. This location or geographic rank may be displayed to interested users of the social networking service.

These rankings may be displayed to users to customize the user experience. In some examples, the rankings may be displayed statically in time, but in other examples, the rankings may show trends. Thus geographic trends, company trends, time trends, and other skill trends may be constructed.

In yet other examples, members may be given recommendations on how to improve their rankings in a particular skill. These recommendations may be based upon the calculations used to arrive at the user's ranking. For example, the ranking may advise a user to seek out another member and connect with them, or advise them to attend a particular school or university, or publish a paper or write a blog on a particular topic.

In some examples, a skill page may be created which shows skill-centric information relating to statistics and rankings of the particular skill. In some examples, the skill page may display a list of individuals sorted by rank, a listing of top employers for the skill, a listing of the top geographic regions, a listing of the top groups for the skill on the social networking site, or any other relevant information.

In still other examples, job postings may be customized for a member based upon their skill rank. In some examples, job postings may only appear to members above or below a certain skill rank, or that possess a certain skill. In some examples, job postings may be delivered automatically by the social or business network to members with a specific rank or a rank exceeding or under a specific amount. In some cases, jobs may not be shown, delivered, or available to members that rank too high in the rankings. This may be because employers do not want someone too skilled and therefore expensive.

Job postings may be customizable based upon a combination of skills and rankings. Thus a job posting may be delivered or viewable only to individuals possessing a requisite rank in multiple skills. Thus for example, a job posting may require a member to be highly ranked in both Java and C++.

In other examples, the system may deliver to a third party, such as a job recruiter, a list of members who possess a particular skill or combination of particular skills. In some examples, the system may deliver to the third party a list of members who possess a requisite rank in the particular skill or combination of particular skills.

Additionally, advertisements may be customized and delivered to a particular member based upon their skill rank in various skills. For example, an individual who ranks highly in C++ might receive advertisements directed at C++ compilers. These advertisements may even be tailored for a level of product based upon a member ranking. For example, an advertisement for an advanced version of the C++ compiler or an advanced programming textbook may be delivered to users that have higher rankings, and advertisements for basic versions of the C++ compiler or a basic programming textbook may be delivered to lower ranking users.

Figure 13:
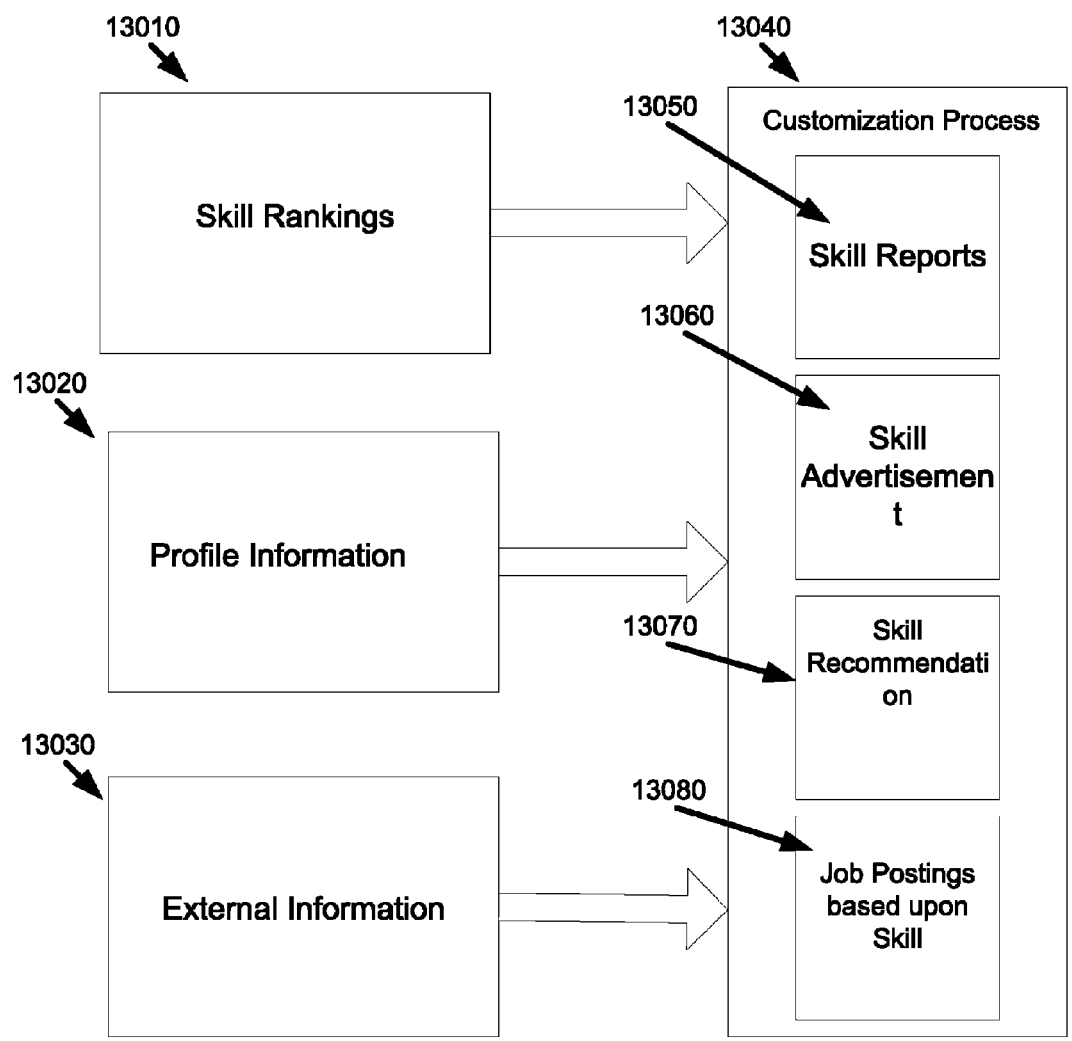
FIG. 13 shows an example social networking site customization system.

FIG. 13 shows an example system for implementing the skills customization. In FIG. 13, skill rankings 13010, profile information 13020, and external information 13030 may be used as input into the customization process 13040. The customization process 13040 may include a skill reports process 13050, a skill advertisement process 13060, a skill recommendation process 13070, and a job posting process 13080.

The skill reports process 13050 may be responsible for utilizing skill rankings 13010, profile information 13020, and external information 13030 to prepare and display reports on the skill hierarchy, skill rankings, company or geographical rankings, or other reports.

The skill advertisement process 13060 may be responsible for delivering advertisements to members based upon their skill rankings. This may include storing criteria for various advertisements. These criteria may specify conditions on which the advertisement will be displayed. Conditions in some examples may include an identification of a certain skill or skills that the member must possess prior to displaying the advertisement to the member. In other examples, the conditions may also include a skill level that a member must have in order for the advertisement to be displayed to the member. Thus for example, the conditions may specify that only members above a certain skill level skilled in coding in the C++ computer language may receive an advertisement for an advanced C++ compiler.

In one example, the skill advertisement process 13060 may find members who match the criteria, and then may be responsible for causing the advertisement to be displayed to the members.

The skill recommendation process 13070 may be responsible for formulating a recommendation for an interested member on how to improve their skill ranking. The skill recommendation process 13070 may use the activities of the interested member, other lower or higher ranked members, and knowledge of the ranking algorithm itself to suggest changes in member behavior, additional activities, or additional connections that may increase the member's ranking. In some examples these recommendations may include connecting with certain members, working for a certain company, or living and working in a certain geographic area, and the like.

The job postings process 13080 may be responsible for matching job posting criteria with qualified members. The job posting criteria may include a desired set of one or more skills that the employer is interested in, and possibly a desired level of skill. The job posting process 13080 then matches job posting criteria with members that match that criteria and may then be responsible for delivering that job posting to members.

Example Social Networking Service

Figure 14:
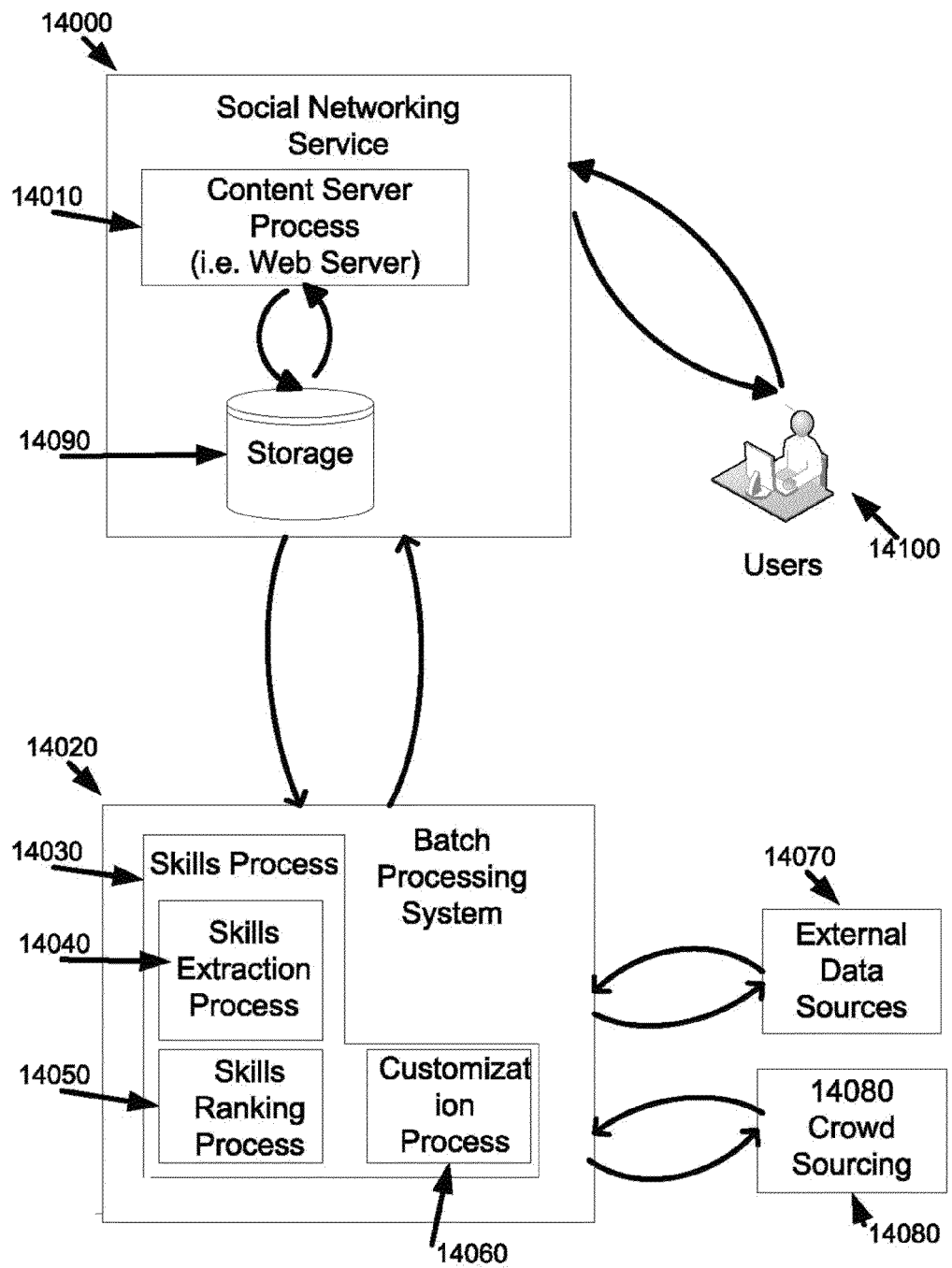
FIG. 14 shows an example social networking system.

FIG. 14 shows an example social networking service 14000 according to one example of the current disclosure. Social networking service 14000 may contain a content server process 14010. Content server process 14010 may communicate with storage 14090 and users 14060 through a network. Content server process 14010 may be responsible for the retrieval, presentation, and maintenance of member profiles stored in storage 14090. Content server process 14010 in one example may include or be a web server that fetches or creates internet web pages, which may include portions of, or all of, a member profile at the request of users 14060.

Users 14060 may be an individual, group, or other member, prospective member, or other user of the social networking service 14000. Users 14060 access social networking service 14000 using a computer system through a network. The network may be any means of enabling the social networking service 14000 to communicate data with a computer remotely, such as the internet, an extranet, a LAN, WAN, wireless, wired, or the like, or any combination.

Skills process 14030 may be responsible for creating the list of skills, ranking members based upon the created list of skills and customizing the social networking service 14000 based upon those rankings. Skills process 14030 in one example may contain a skills extraction process 14040 to create a list of skills based upon member profiles, a skills ranking process 14050 for ranking users relative to each other for each skill in the list of skills, and a customization process 14060 which uses the skills and rankings to customize the social networking service 14000 for the members based upon the skill rankings.

Batch processing system 14020 may be a computing entity which is capable of data processing operations either serially or in parallel. In some examples, batch processing system 14020 may be a single computer. In other examples, batch processing system 14020 may be a series of computers setup to process data in parallel. In some examples, batch processing system 14020 may be part of social networking service 14000.

Skills process 14030 may communicate with the social networking service 14000 to get information used by the skills process 14030 such as member profiles or information from member profiles, and to customize the social networking service 14000 based upon the skills and their rankings.

Skills process 14030 may also communicate with a crowd-sourcing application 14080 and various external data sources 14070 across a network. The network may be any method of enabling communication between social networking service 14000 and crowd sourcing application 14080 and/or external data sources 14070. Examples may include, but are not limited to, the internet, an extranet, a LAN, WAN, or wireless network. Skills process 14030 submits de-duplication jobs through the network to the crowdsourcing application 14080 for de-duplication. Crowdsourcing application 14080 may return the results back over the network. Skills process 14030 may also utilize a network to access various remote data systems. The various described networks may be the same or different networks.

Skills extraction process 14040 may extract a standardized list of skills from the various member profiles as well as calculating the various statistics and meta data about those skills. Skills ranking process 14050 may rank members based on the provided skills. Customization process 14060 may customize the social networking service 14000 based upon the skill rankings.

Figure 15:
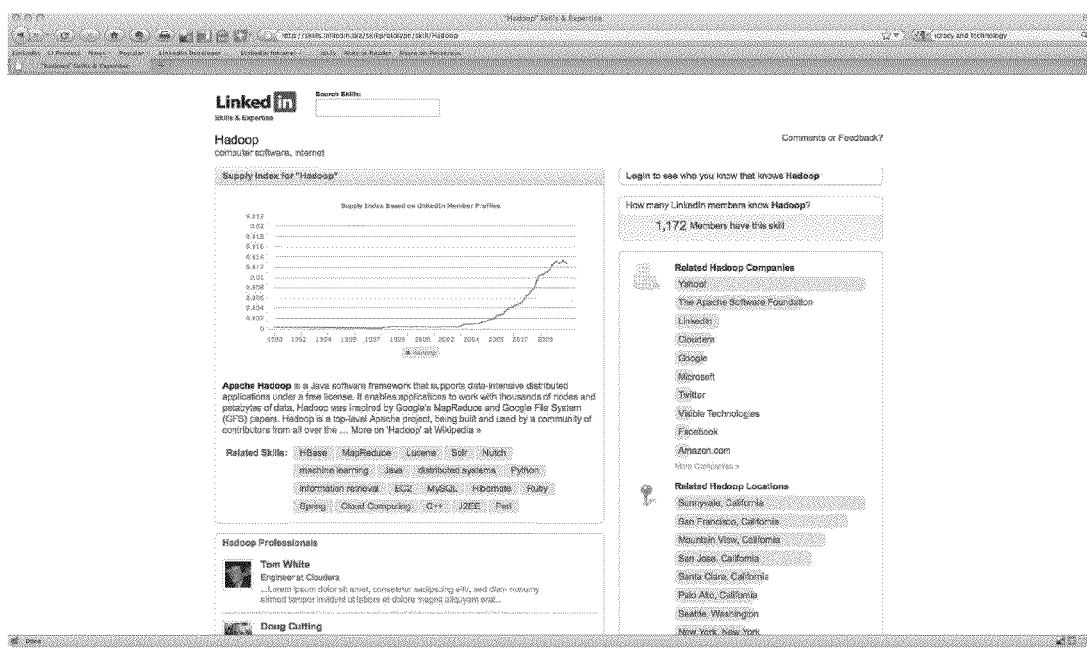
FIG. 15 shows a first screen capture of an example of aspects of the current disclosure.
Figure 16:
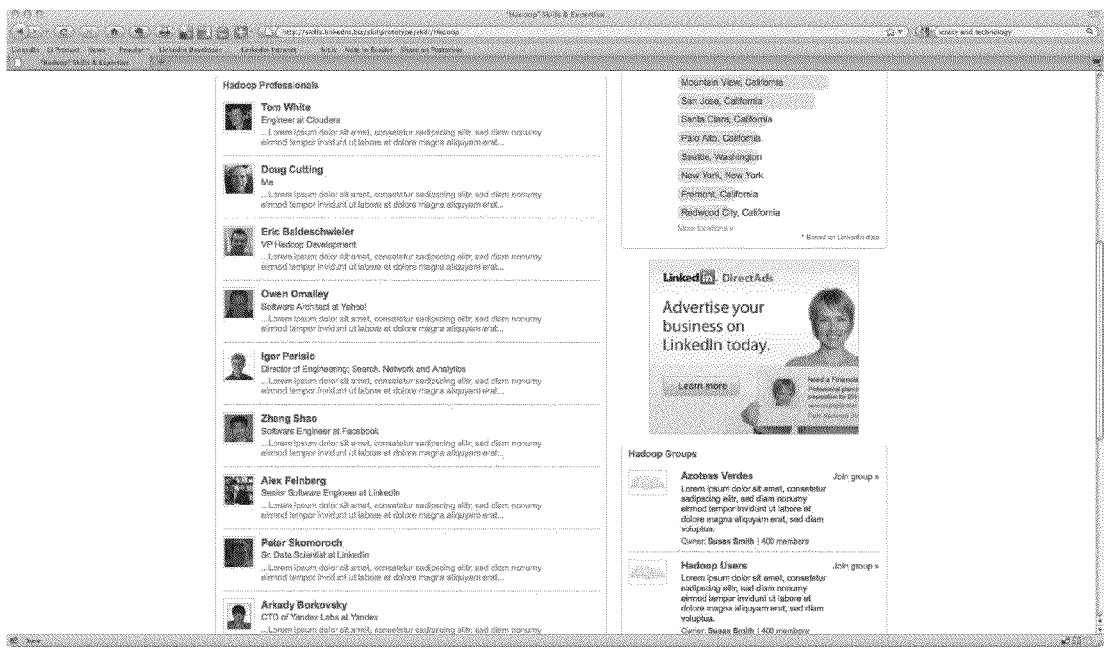
FIG. 16 shows a second screen capture of an example of aspects of the current disclosure.
Figure 17:
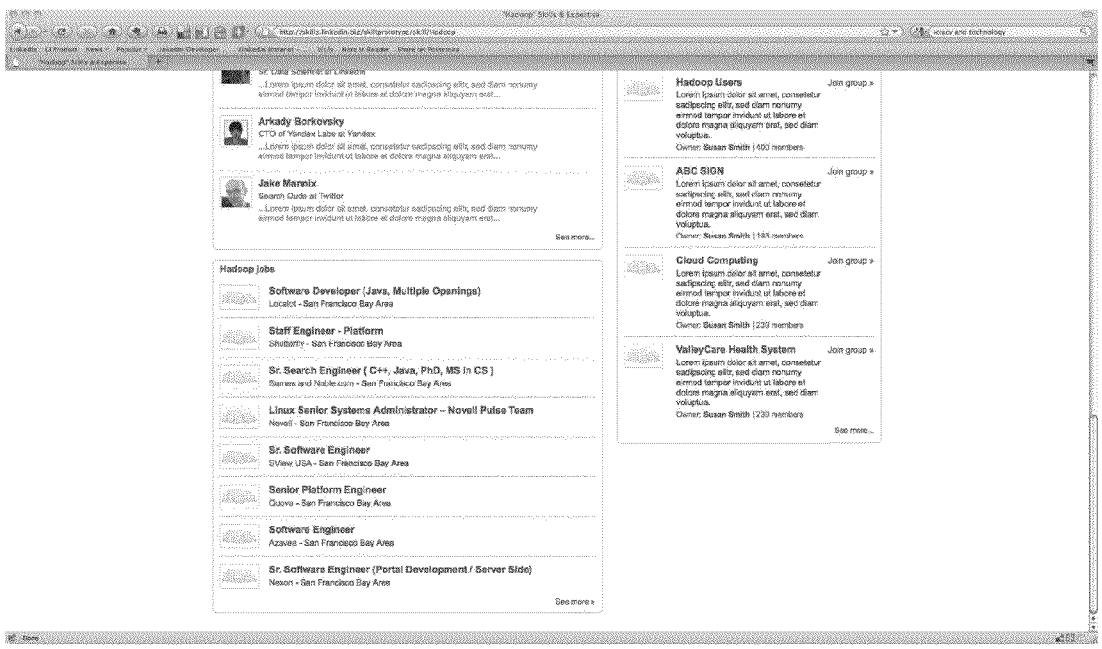
FIG. 17 shows a third screen capture of an example of aspects of the current disclosure.

FIG. 15-FIG. 17 show screen captures of example user interfaces implementing the customization techniques of the present disclosure. In FIG. 15, a supply index graph is shown that maps the number of LinkedIn members who possess the skill "Hadoop" over a period of years (1990-present). FIG. 15 also shows links and functionality that allows a member to see other members that they are connected to that have "Hadoop" as a skill. FIG. 15 shows the number of members of the site that have "Hadoop" as a skill, and a ranking of companies and locations based upon the "Hadoop" skill. A list of related skills is shown, as well as the top ranking members.

FIG. 16 shows a more complete view of the ranking of members who know "Hadoop," as well as a number of member groups that possess the "Hadoop" skill.

FIG. 17 shows a listing of jobs that require a "Hadoop" skill, as well as additional members with Hadoop and additional groups of Hadoop users.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Computer Architecture

Figure 18:
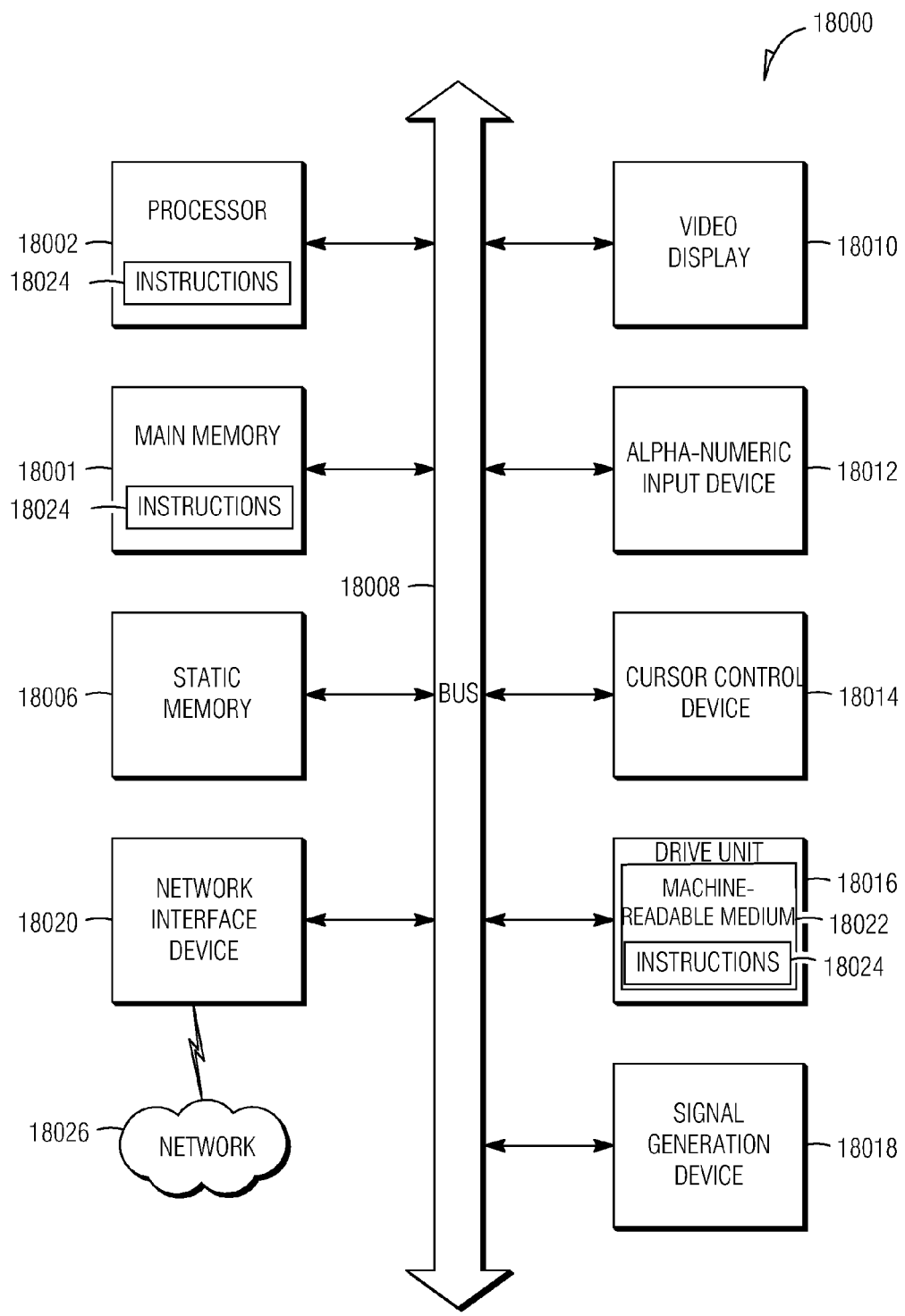
FIG. 18 shows an example computer system.

FIG. 18 shows a diagrammatic representation of a machine in the example form of a computer system 18000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 18000 includes a processor 18002 (e.g., a Central Processing Unit (CPU), a Graphics Processing Unit (GPU) or both), a main memory 18001 and a static memory 18006, which communicate with each other via a bus 18008. The computer system 18000 may further include a video display unit 18010 (e.g., a Liquid Crystal Display (LCD) or a Cathode Ray Tube (CRT)). The computer system 18000 also includes an alphanumeric input device 18012 (e.g., a keyboard), a User Interface (UI) cursor controller 18014 (e.g., a mouse), a disk drive unit 18016, a signal generation device 18018 (e.g., a speaker) and a network interface device 18020 (e.g., a transmitter).

The disk drive unit 18016 includes a machine-readable medium 18022 on which is stored one or more sets of instructions 18024 and data structures (e.g., software) embodying or used by any one or more of the methodologies or functions illustrated herein. The software may also reside, completely or at least partially, within the main memory 18001 and/or within the processor 18002 during execution thereof by the computer system 18000, the main memory 18001 and the processor 18002 also constituting machine-readable media.

The instructions 18024 may further be transmitted or received over a network 18026 via the network interface device 18020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

We claim:

1. A method comprising:
   extracting a plurality of skill seed phrases from a plurality of member profiles of a social networking service;
   using one or more computer processors, disambiguating the plurality of skill seed phrases to create a plurality of disambiguated skill seed phrases; and
   de-duplicating the plurality of disambiguated skill seed phrases to create a plurality of de-duplicated skill seed phrases, the de-duplicated skill seed phrases identifying a plurality of skills; and
   wherein de-duplicating the plurality of disambiguated skill seed phrases comprises:
   calculating a plurality of internet search queries, at least one for each of the plurality of disambiguated skill seed phrases, the internet search queries, when executed, returning a list of internet web pages;
   for each of the plurality of internet search queries, submitting to a crowd sourcing application, over a network, a job for which the crowd sourcing application returns a specific internet web page selected from the list of internet web pages that is returned from each of the plurality of the internet search queries, the specific internet web page representing an interpretation of a meaning of the disambiguated skill seed phrase corresponding to each internet search query; and using the plurality of returned specific internet web pages to determine which of the plurality of disambiguated skill seed phrases identify identical skills.

2. The method of claim 1, wherein extracting the plurality of skill seed phrases comprises:
   tokenizing a portion of the plurality of member profiles into a plurality of tokens; and
   analyzing frequency information of the tokens to determine the plurality of skill seed phrases.

3. The method of claim 2, wherein extracting the plurality of skill seed phrases further comprises:
   removing skill seed phrases that do not correspond with actual skills.

4. The method of claim 1, wherein creating a plurality of disambiguated skill seed phrases comprises:
  clustering the plurality of skill seed phrases based on a frequency of co-occurrence of the plurality of skill seed phrases.

5. The method of claim 4, wherein the clustering is done using an expectation maximum method.

6. The method of claim 1, further comprising: calculating attributes about the plurality of disambiguated skill seed phrases and storing the attributes in association with the plurality of disambiguated skill seed phrases.

7. The method of claim 6, wherein gathering attributes about the plurality of disambiguated skill phrases comprises computing a top industry of each of the plurality of disambiguated skill phrases based upon an industry listed in member profiles in which each skill seed phrase was found.

8. The method of claim 1, further comprising: submitting more than one job for each of the plurality of internet search queries and using an algorithm to select among the returned specific internet web pages to determine which of the returned specific internet web pages for each internet search query is used to determine which of the plurality of disambiguated skill seed phrases identify the identical skills.

9. A system, comprising:
  one or more computer processors configured to include:
    an extraction module configured to extract a plurality of skill seed phrases from a plurality of member profiles of a social networking service;
    a disambiguation module configured to disambiguating the plurality of skill seed phrases to create a plurality of disambiguated skill seed phrases; and
    a de-duplication module configured to:
      de-duplicate the plurality of disambiguated skill seed phrases to create a plurality of de-duplicated skill seed phrases, the plurality of de-duplicated skill seed phrases identifying a plurality of skills;
      wherein the de-duplication module is configured to de-duplicate the plurality of disambiguated skill seed phrases by at least being configured to:
      calculate a plurality of internet search queries, at least one for each of the disambiguated skill seed phrases, the internet search queries, when executed, returning a list of internet web pages;
      for each of the plurality of internet search queries, submit to a crowd sourcing application over a network, a job for which the crowd sourcing application returns a specific internet web page selected from the list of internet web pages that is returned from each of the plurality of the internet search queries, the specific internet web page representing an interpretation of a meaning of the disambiguated skill seed phrase corresponding to each internet search query; and use the plurality of returned specific internet web pages to determine which of the plurality of disambiguated skill seed phrases identify identical skills.

10. The system of claim 9, wherein the extraction module is configured to extract the plurality of skill seed phrases by at least being configured to:
  tokenize a portion of the plurality of member profiles into a plurality of tokens and analyze frequency information of the tokens to determine the plurality of skill seed phrases.

11. The system of claim 9, wherein the extraction module is configured to remove skill seed phrases that do not correspond with actual skills.

12. The system of claim 9, wherein the disambiguation module is configured to disambiguate the plurality of skill seed phrases by at least being configured to:
  cluster the plurality of skill seed phrases based on a frequency of co-occurrence of the plurality of skill seed phrases.

13. The system of claim 12, wherein the disambiguation module is configured to cluster the plurality of skill seed phrases by at least being configured to:
  execute an expectation maximum operation.

14. The system of claim 9, wherein the disambiguation module is further configured to calculate attributes about the plurality of disambiguated skill seed phrases and store the attributes in association with the plurality of disambiguated skill seed phrases.

15. The system of claim 14, wherein the attributes about the plurality of disambiguated skill seed phrases includes a top industry of at least one of the plurality of disambiguated skill phrases computed based upon an industry listed in the member profiles in which the at least one of the plurality of disambiguated skill seed phrases was found.

16. The system of claim 9, wherein the de-duplication module is configured to: submit multiple jobs for each of the plurality of disambiguated skill seed phrases and select among the returned specific internet web pages using an algorithm to determine which of the returned specific internet web pages for that internet search query is used to determine which of the plurality of disambiguated skill seed phrases identify identical skills.

17. A non-transitory machine readable storage medium including instructions, which when executed on the machine, cause the machine to:
  extract a plurality of skill seed phrases from a plurality of member profiles of a social networking service;
  disambiguate the plurality of skill seed phrases to create a plurality of disambiguated skill seed phrases; and
  de-duplicate the plurality of disambiguated skill seed phrases to create a plurality of de-duplicated skill seed phrases, the de-duplicated skill seed phrases identifying a plurality of skills; and
  wherein the instructions for de-duplication cause the machine to:
    calculate a plurality of internet search queries, at least one for each of the plurality of disambiguated skill seed phrases, the internet search queries, when executed returning a list of internet web pages;
    for each of the plurality of internet search queries, submitting to a crowd sourcing application, over a network, a job for which the crowd sourcing application returns a specific internet web page selected from the list of internet web pages that is returned from each of the plurality of the internet search queries, the specific internet web page representing an interpretation of a meaning of the disambiguated skill seed phrase corresponding to each internet search query; and
    use the plurality of returned specific internet web pages to determine which of the plurality of disambiguated skill seed phrases identify identical skills.

18. The machine readable medium of claim 17, wherein the instructions for extracting the plurality of skill seed phrases comprises instructions, which when executed on the machine, cause the machine to:
  tokenize a portion of the plurality of member profiles into a plurality of tokens; and
  analyze frequency information of the tokens to determine the plurality of skill seed phrases.

19. The machine readable medium of claim 18, wherein the instructions for extracting the plurality of skill seed phrases comprises instructions, which when executed on the machine, cause the machine to:

remove skill seed phrases that do not correspond with actual skills.

20. The machine readable medium of claim 17, wherein the instructions for creating a plurality of disambiguated skill seed phrases comprise instructions, which when executed on the machine, cause the machine to:

cluster the plurality of skill seed phrases based on a frequency of co-occurrence of the plurality of skill seed phrases.

21. The machine readable medium of claim 20, wherein the instructions for clustering include instructions, which when executed on the machine, cause the machine to implement an expectation maximum method.

22. The machine readable medium of claim 17, wherein the instructions further comprise instructions which when executed by the machine cause the machine to:

calculate attributes about the plurality of disambiguated skill seed phrases and store the attributes in association with the plurality of disambiguated skill seed phrases.

23. The machine readable medium of claim 22, wherein the instructions for gathering attributes about the plurality of disambiguated skill phrases comprises instructions, which when executed on the machine, cause the machine to: compute a top industry of each of the plurality disambiguated skill phrases based upon an industry listed in member profiles in which each skill seed phrase was found.

24. The machine readable medium of claim 17, wherein the instructions for de-duplication comprises instructions, which when executed on the machine, cause the machine to: submit more than one job for each of the plurality of internet search queries and utilize an algorithm to select among the returned specific internet web pages to determine which of the returned specific internet web pages for each internet search query is used to determine which of the plurality of disambiguated skill seed phrases identify the identical skills.

* * * * *